(No Model.) 5 Sheets—Sheet 1.
H. W. PEARSON.
APPARATUS FOR CONTROLLING VALVES OF BATHS, BASINS, &c.
No. 552,544. Patented Jan. 7, 1896.
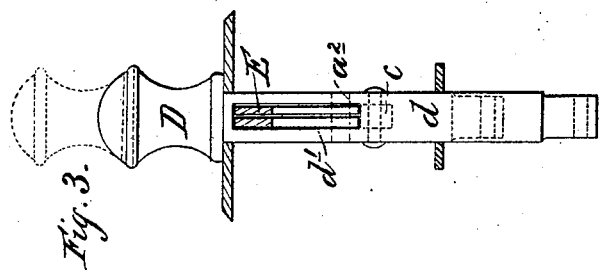
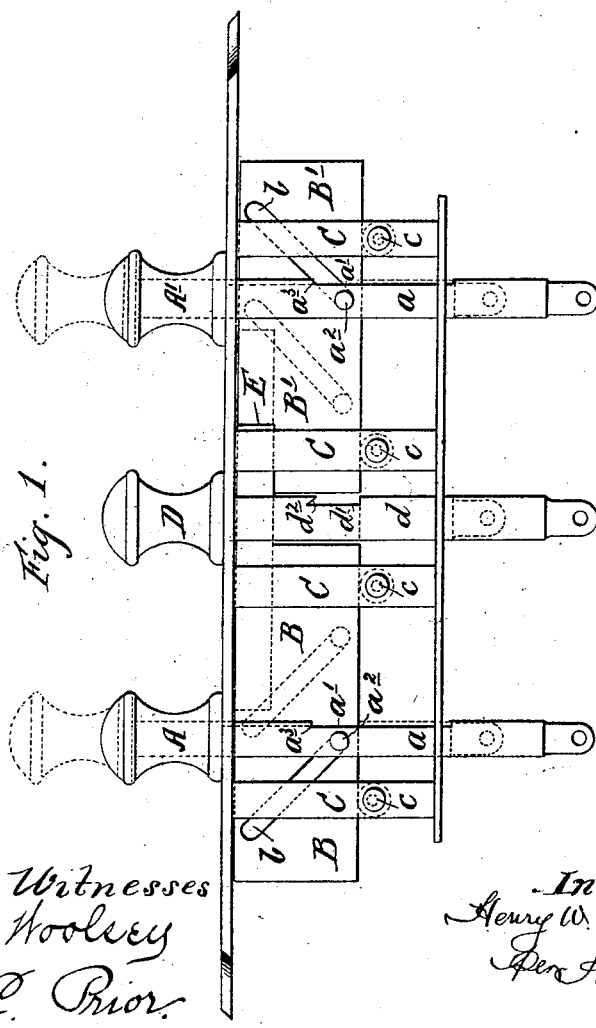
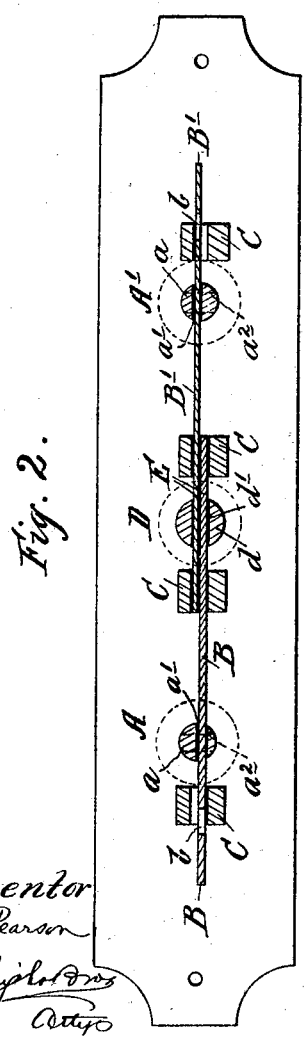
Witnesses
L. Woolsey
C. Prior.
Inventor
Henry W. Pearson (No Model.) 5 Sheets—Sheet 2.
H. W. PEARSON.
APPARATUS FOR CONTROLLING VALVES OF BATHS, BASINS, &c.
No. 552,544. Patented Jan. 7, 1896.
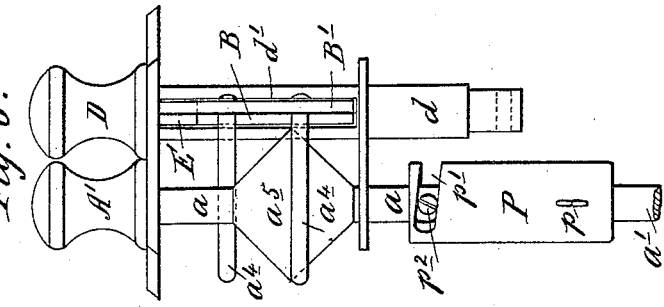
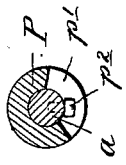
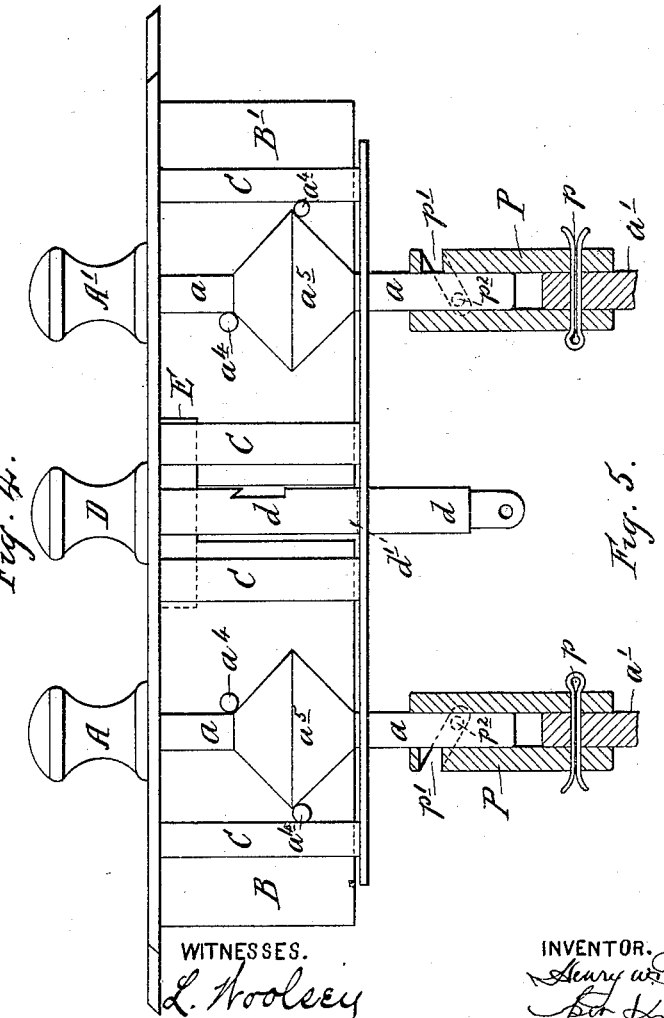
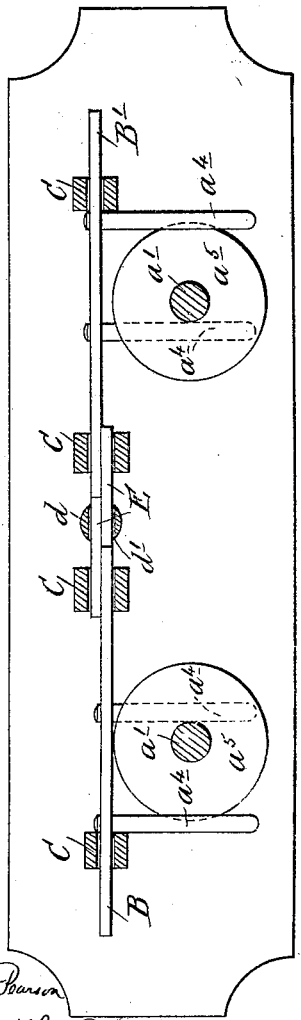
WITNESSES.
L. Woolsey
C. Prior.
INVENTOR.
Henry W. Pearson (No Model.) 5 Sheets—Sheet 3.
H. W. PEARSON.
APPARATUS FOR CONTROLLING VALVES OF BATHS, BASINS, &c.
No. 552,544. Patented Jan. 7, 1896.
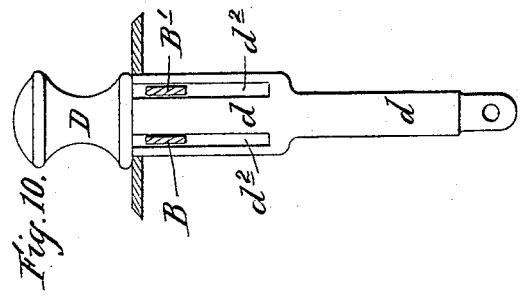
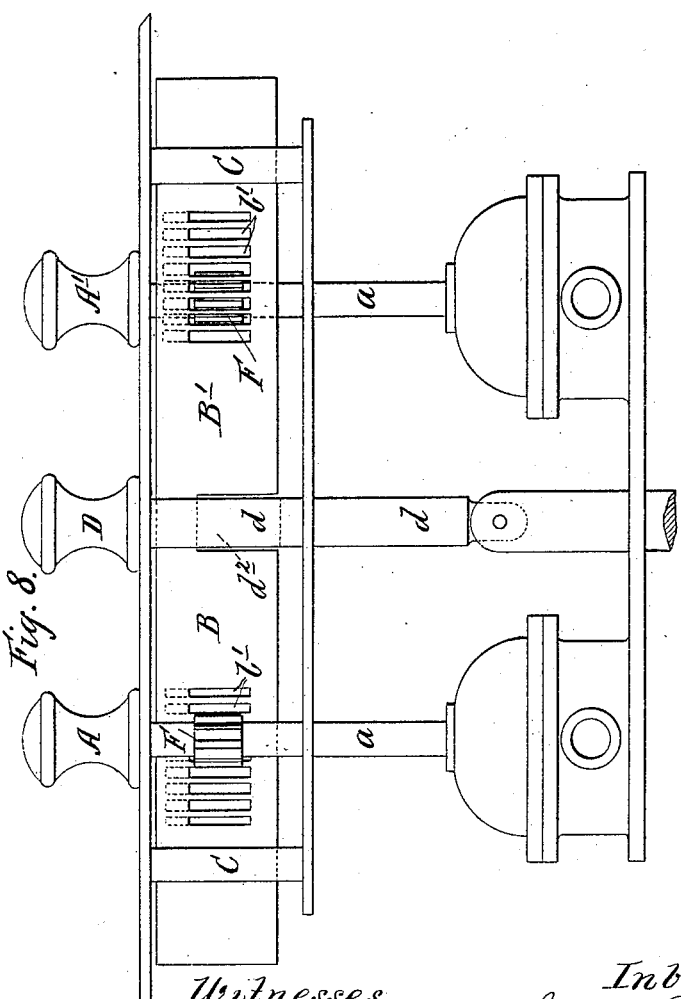
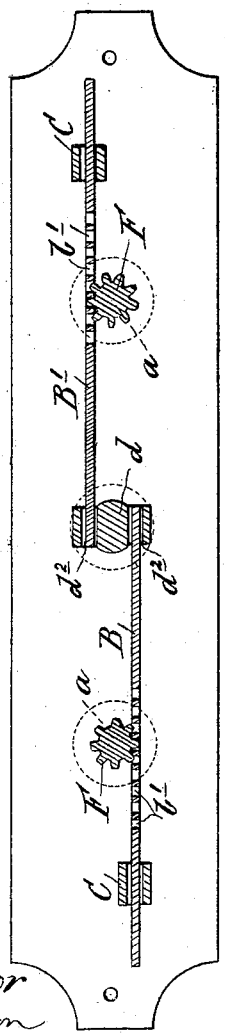
Witnesses
L. Woolsey.
C. Prior.
Inventor
Henry W. Pearson
per Knight Bros.
atty's.
ANDREW B.GRAHAM. PHOTO-LITHO. WASHINGTON, D.C.

(No Model.) 5 Sheets—Sheet 4.
H. W. PEARSON.
APPARATUS FOR CONTROLLING VALVES OF BATHS, BASINS, &c.
No. 552,544. Patented Jan. 7, 1896.
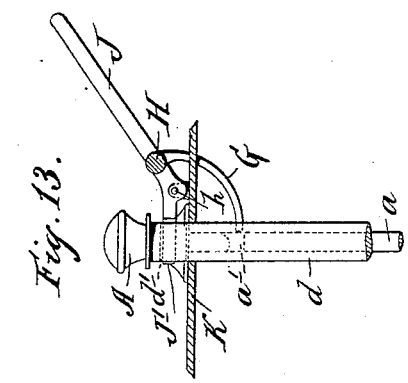
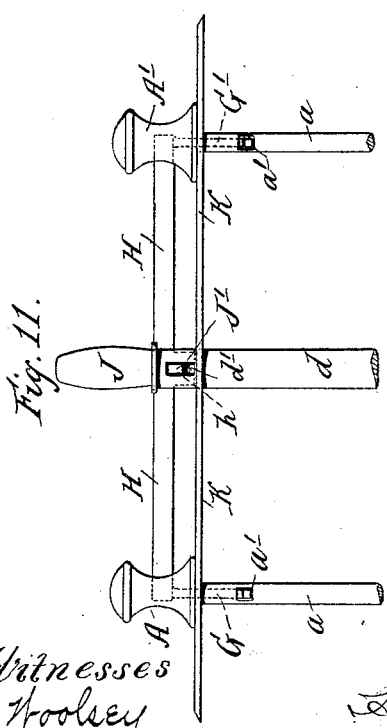
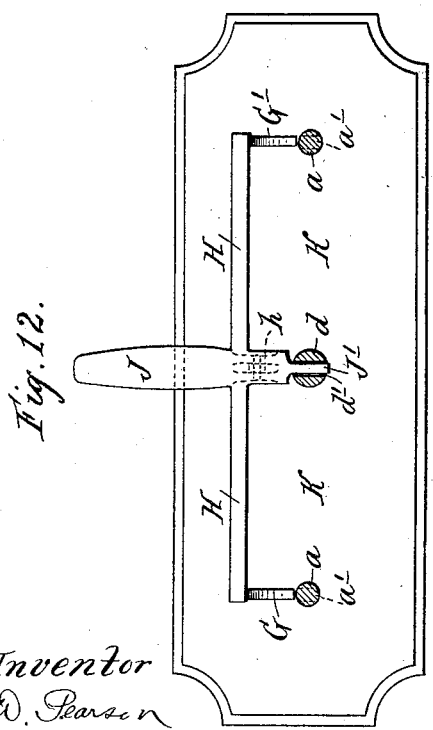
Witnesses
L. Woolsey
C. Prior
Inventor
Henry W. Pearson
per Knight Bros
atty's (No Model.) 5 Sheets—Sheet 5.
H. W. PEARSON.
APPARATUS FOR CONTROLLING VALVES OF BATHS, BASINS, &c.
No. 552,544. Patented Jan. 7, 1896.
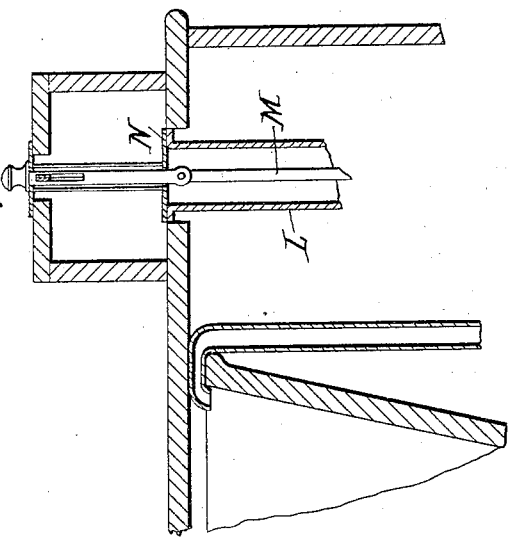
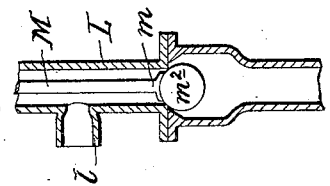
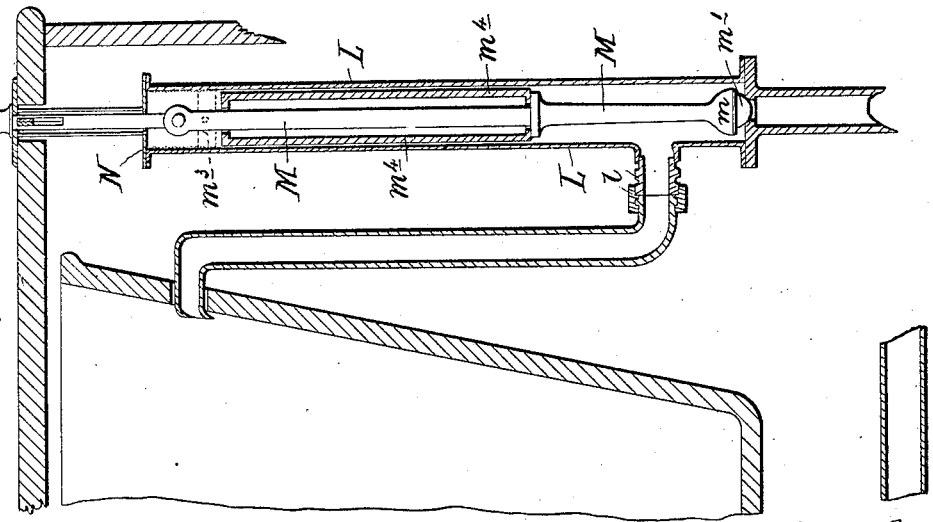

UNITED STATES PATENT OFFICE.

HENRY WILLIAM PEARSON, OF BRISTOL, ENGLAND.

APPARATUS FOR CONTROLLING VALVES OF BATHS, BASINS, &c.

SPECIFICATION forming part of Letters Patent No. 552,544, dated January 7, 1896.

Application filed April 22, 1893. Serial No. 471,430. (No model.) Patented in England March 16, 1892, No. 5,190, and March 1, 1893, No. 4,433.

*To all whom it may concern:*

Be it known that I, HENRY WILLIAM PEARSON, engineer of Bristol water-works, residing at 11 Alexandra Road, Clifton, Bristol, in the county of Gloucester, England, have invented Improvements in Apparatus for Controlling the Relative Opening and Closing of Inlet and Outlet Valves of Baths, Basins, and the Like, and in the Valves for Use Therewith, (for which I have obtained patents in England, No. 5,190, dated March 16, 1892, and No. 4,433, dated March 1, 1893,) of which the following is a specification.

This invention relates to improvements in apparatus for controlling the relative opening and closing of inlet and outlet valves of baths, basins, and the like, and in the valves for use therewith, and has for its object to provide an arrangement of apparatus and valves whereby the opening of an inlet valve or valves will automatically lock the waste or outlet valve, and also when the waste or outlet valve is open the inlet valve or valves cannot be opened; also, owing to the construction of the valves, which may be either lift-up, screw-down, or sliding valves, they can be manufactured much cheaper than hitherto. The locking apparatus may be applied to all kinds of lift-up, screw-down, or sliding valves for baths, basins, and other vessels for containing water or other liquids.

Figure 1 is an elevation, Fig. 2 a sectional under plan, and Fig. 3 an end elevation, shown partly in section, of a locking apparatus applicable to lift-up valves. Figs. 4, 5, and 6 are similar views of a modification, and Fig. 7 a sectional detail of same. Figs. 8, 9, and 10 are similar views of a locking apparatus applicable either to diaphragm, loose, or screw-down valves. Fig. 11 is an elevation, Fig. 12 a plan, partly in section, and Fig. 13 an end elevation, of a locking apparatus applicable to lifting, screwing, or sliding valves. Fig. 14 is a part sectional elevation of an improved valve, and Figs. 15 and 16 are similar views of modifications of same.

Referring to Figs. 1, 2, and 3, I provide the inlet valve or valves A A' with spindles $a$, which are formed with central openings or slots $a'$, and provided with projections or cross-pins $a^2$, which engage with or bear against the inclined surfaces of the inclined slots or openings $b$ formed in the sliding plates or bolts B B'. The said plates or bolts B B' work in suitable guides C, which may be provided with antifriction-rollers $c$, so as to enable the plates or bolts to slide easier.

The spindle $d$ of the outlet or waste valve D is provided with a slot $d'$ in line with the said plates or bolts B B', so that when an inlet-valve spindle $a$ is raised its projection or pin $a^2$ bears against the inclined surfaces of the bolt's slot $b$ and so urges the plate or bolt forward a sufficient distance as to enable its end entering into the slot $d'$ of the waste-valve spindle $d$, and by so doing prevents the said waste-valve from being opened until the inlet valve or valves have been closed. On an inlet-valve spindle being pushed down, so as to close the valve, the projection or pin $a^2$ will bear against the inclined surfaces of the plate or bolt's slot $b$ in connection therewith, and so withdraw the said plate or bolt from the slot $d'$ of the outlet-valve spindle $d$, and (as shown when more than one inlet-valve is employed) when all the inlet plates or bolts have been thus withdrawn the outlet-valve may be opened. When the outlet-valve D is opened its slot $d'$ will not be in position to receive the plate or bolt of an inlet-valve, but it will present an obstruction to the movement of such a plate or bolt, and therefore the projection or pin $a^2$ of the inlet-valve which bears against the inclined surface of the plate or bolt will prevent the said inlet-valve from being raised.

To prevent the inlet-valve spindles falling or to hold them up when required, I form recesses or notches $a^3$ on the said spindles, which on the spindles being raised and slightly turned engage with and rest upon the top edges of the bolts or plates B B' until the valves are required to be closed, when the spindles are slightly turned so as to clear the plates or bolts and then lowered. In like manner I form the outlet-valve spindle $d$ with a recess or notch $d^2$, which engages with the top edges of the plates or bolts guiding tailpieces E; or I may, as shown in Figs. 4, 5 and 6, form or provide the sliding plates or bolts B B', which lock and unlock the valve-spindles $a$, with two or more pins or projections $a^4$, which work against the surfaces of conical spheres or other suitably-shaped pieces of metal $a^5$ secured to or formed on the spindles $a$ of the inlet-valves, so that on said spindles $a$ being revolved to open or shut the valves the bolts B B' are either locked or unlocked. In this case the outlet-valve spindle $d$ would preferably be formed with one slot $d'$.

When applying my apparatus to screw down diaphragm or loose valves, I proceed as is shown in Figs. 8, 9 and 10 of the drawings—that is to say, I form or provide the plates or bolts B B' with a number of toothed openings or slots $b'$, so as to act as a rack into which spur, cogged or ratchet pinions F work, the said pinions F being mounted or formed on the inlet-valve spindles $a$. In order to allow the plates or bolts B B' to engage with the outlet-valve spindle $d$, I preferably form or provide the said spindle $d$ with two slots or openings $d^2$ arranged one on either side, as shown, so as to enable the spindles being kept in line with each other, as shown.

If desired, in either of the foregoing cases I may make the bolts of a quadrant shape and provide or form the outlet valve's spindle with two slots; or when applying my apparatus to a lift-up outlet-valve and screw-down, sliding or lift-up inlet-valves, I proceed as is shown in Figs. 11, 12 and 13—that is to say, I provide an arrangement of quadrant-arms G G' secured to or formed on cross bar or rod H, which is pivoted at $h$ and provided with an operating-handle J for raising and lowering the outlet-valve spindle $d$ by means of its engaging arm or tailpiece J', the end of which engages with the slot $d'$ in the spindle $d$, thus forming an apparatus which on the outlet-valve spindle $d$ being raised by depressing the handle J, which may be provided with a detention-catch for keeping it in its depressed position, the bolts or arms G G' would be shot into the slots $a'$ of the inlet-valve's spindles A; or, if desired, I may form the arms G G' so as to act above the plate K instead of below it, in which case the tailpiece J' of the handle J would be formed so as to pass around a groove or recess formed on the handle of the waste-valve, and be then pivoted at its rear end in lieu of at the lower end of the handle J, as shown at $h$. Either of said arrangements may be so formed as to work with a waste-valve which requires to be lifted or with one which requires to be depressed to open it, and the inlet-valves may be either lifting-up, screw-down or sliding valves.

I claim—

In a supply and waste valve, the combination of the inlet valves, the waste valve, the locking slides moved by the inlet valve stems, the waste valve stem engaging with said slides and locked thereby.

In testimony whereof I have signed my name to this specification in the presence of two subscribing witnesses.

HENRY WILLIAM PEARSON.

Witnesses:
ERNEST E. STREET,
J. W. HUDSON.